Feb. 9, 1932. J. E. HILL ET AL 1,844,091
THRESHER AND CYLINDER GRATE THEREFOR
Filed Dec. 29, 1928   2 Sheets-Sheet 2
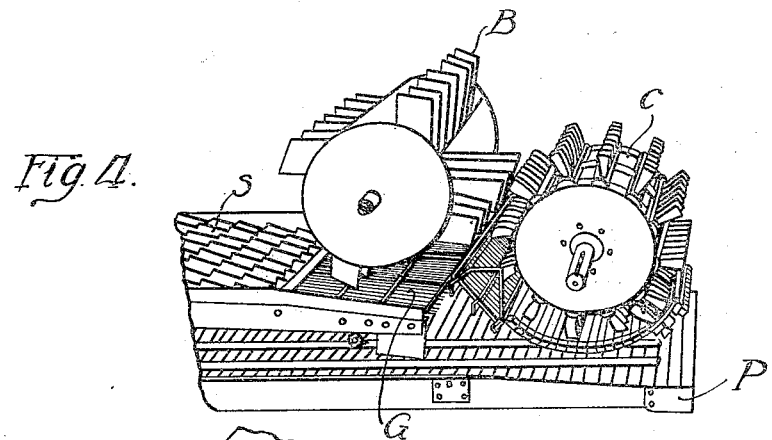
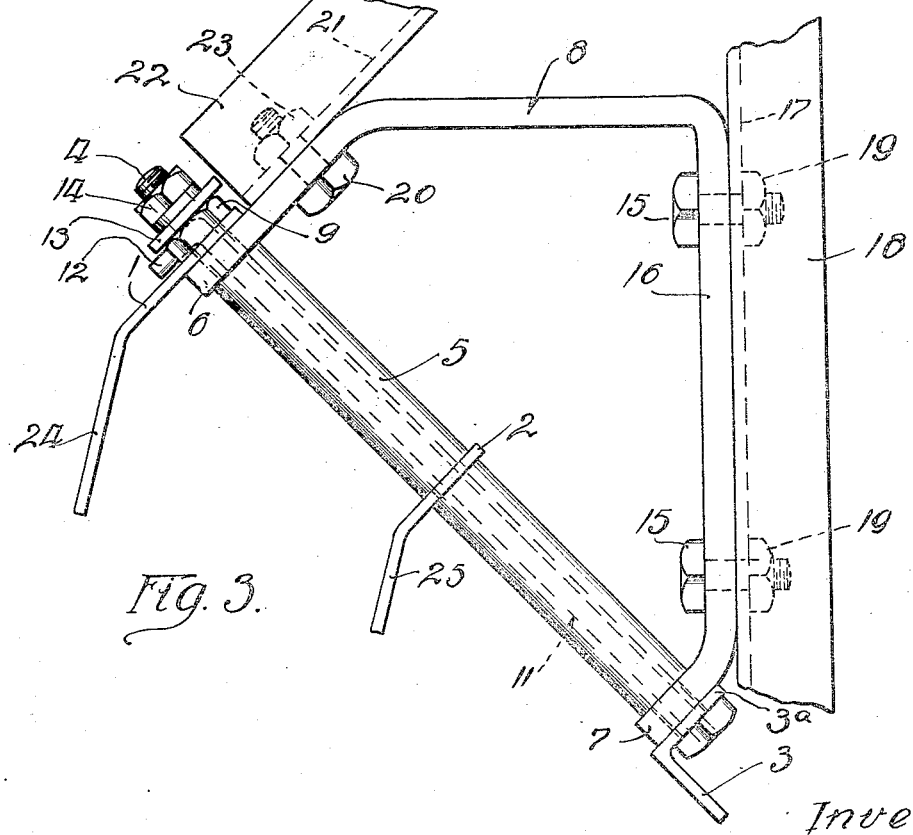
Inventors.
James E. Hill.
George W. Troutman
By
Attys.

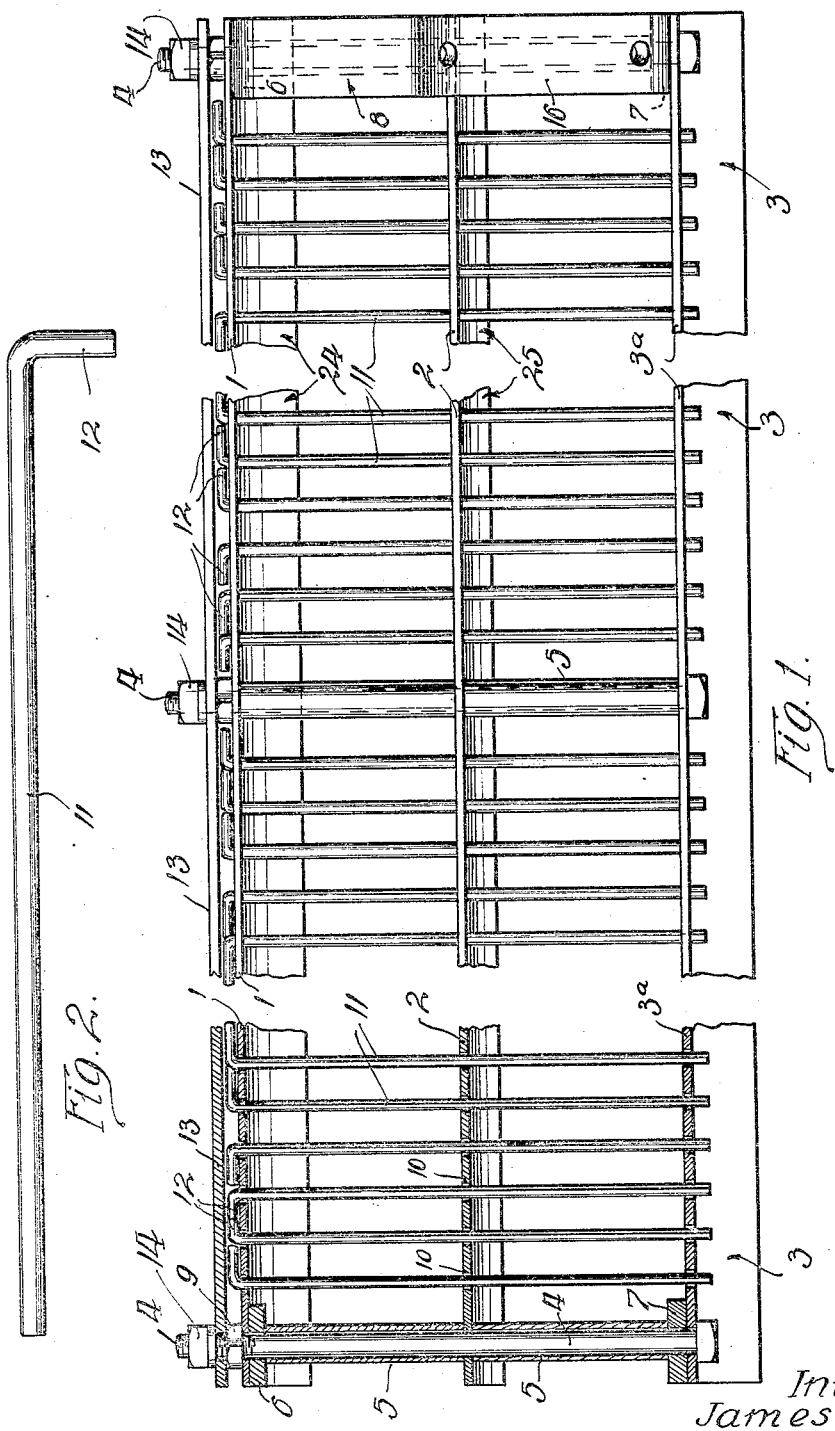

Patented Feb. 9, 1932

1,844,091

UNITED STATES PATENT OFFICE

JAMES E. HILL AND GEORGE W. TROUTMAN, OF PEORIA, ILLINOIS, ASSIGNORS TO AVERY POWER MACHINERY COMPANY, OF PEORIA, ILLINOIS, A CORPORATION OF ILLINOIS

THRESHER AND CYLINDER GRATE THEREFOR

Application filed December 29, 1928. Serial No. 329,174.

This invention relates to threshing machines, and more particularly to the construction of a cylinder grate and the disposition of such grate relative to the cylinder and the grain pan and associated parts.

It is desirable that the cylinder of the threshing machine be rotated at high speed to effect proper separation of the grain and efficiency in operation. When the cylinder is driven at high speed an appreciable quantity of the grain is projected from the cylinder rearwardly onto the straw rack, which grain has to be handled by the racks and separated from the straw and chaff. This grain is thus separated twice, which is objectionable as entailing unnecessary work and reducing the output of the machine.

We have found that this objection can be avoided by providing suitable means whereby the grain which has been separated by the cylinder, and concaves and grates is deflected downwardly into the grain pan.

The condition of the grain being threshed often varies widely and, under certain unfavorable conditions of the grain, it is impossible to obtain satisfactory results in threshing when using a grate the bars or rods of which are spaced apart the same distance as they are spaced for threshing thoroughly ripe grain in dry and clean condition. We have found that this objection can be avoided by providing a cylinder grate in which the spacing of the rods can be adjusted to suit conditions. It is thus possible to obtain maximum efficiency at all times for given conditions of the grain being threshed.

One of the main objects of our invention is to provide a cylinder and grate and associated parts so related as to prevent the grain which has been separated out by the action of the cylinder, concaves and grates from being projected rearwardly by the cylinder onto the straw rack. A further object is to provide a cylinder grate of relatively simple and inexpensive construction capable of having the spacing of the grate rods varied to suit conditions. Further objects and advantages of our invention will appear from the detailed description.

In the drawings:

Fig. 1 is a front view, partly broken away and in section, of a grate constructed in accordance with our invention;

Fig. 2 is a detail of one of the grate rods;

Fig. 3 is an end view of the grate illustrating the manner of supporting the same;

Fig. 4 is a perspective view illustrating the grate as applied in conjunction with a cylinder, beater, straw rack, grain pan and associated parts of a threshing machine.

The grate includes a suitable frame comprising a top bar 1, a central bar 2, and a lower angle bar 3. These bars are connected by bolts 4 passing through the same, these bolts also passing through spacing sleeves 5, and arms 6 and 7 of substantially V-shaped end brackets 8. The heads of the bolts bear against the under face of the upper flange 3a of angle bar 3 and nuts 9 are screwed upon these bolts and bear against the upper face of the upper bar 1, the arms 6 and 7 of the brackets being confined between upper bar 1 and flange 3a and the sleeves 5. The bolts and the sleeves thus act to connect the bars of the frame and to hold them in spaced relation, these bolts also acting to secure the bars to the brackets 8.

Bars 1 and 2, and flange 3a of the lower bar 3 are provided with spaced openings 10, these openings being aligned transversely of the grate frame. Grate rods 11 are inserted through the openings of the bars and extend transversely of the frame in parallel spaced relation. These rods may be formed from heavy wire or from steel rod material cut into suitable lengths. Each rod 11 has its upper end portion bent substantially at right angles to provide a stop finger 12 which serves to positively limit movement of the rod in one direction through the bars of the frame.

A clamping or stop bar 13 fits upon the upper ends of bolts 4 and is secured thereon by nuts 14 screwed onto the bolts. The nuts 9 act as spacing members to hold the bar 13 spaced away from bar 1 and closely adjacent fingers 12 of the rods 11. The rods are thus held against movement in either direction sufficiently to withdraw them from the bars of the frame and are thus retained in proper operative position.

This grate is mounted in the frame of the threshing machine adjacent the lower rearward portion of cylinder C, by means of suitable bolts 15 inserted through vertical arms 16 of the brackets 8, these bolts passing through flanges 17 of angle strips or plates 18 which may be secured to the frame of the machine in a suitable manner, or may form a portion of such frame. Nuts 19 are threaded onto the bolts 15. Bolts 20 pass through the upper arms 6 of brackets 8 and through flanges 21 of angle strips 22 disposed at an inclination above the grate, nuts 23 being threaded onto these bolts. The brackets thus provide simple and highly efficient means whereby the grate can be readily mounted in rear of the cylinder and at an inclination downwardly toward the cylinder.

The bar 1 is provided with a rearward extension which is disposed at an angle thereto and is inclined downwardly and rearwardly of the grate forming a baffle 24. The bar 2 is provided with a baffle 25 similar to the baffle 24 but of less width. As will be noted more clearly from Fig. 3, the lower edge of baffle 24 extends below the upper edge of plate 2 when the grate is supported in operated relation to the cylinder C.

By disposing the rods 11 transversely of the grate frame, these rods are disposed transversely of cylinder C, and this assures that the materials discharged from the cylinder will flow over the grates with a minimum of resistance and a maximum of separation. The grain which is freed and separated by the cylinder, concaves and grates and is projected from the cylinder strikes against the baffles 24 and 25 and is deflected thereby downwardly into a grain pan P disposed beneath the grate and straw rack S. These baffle members thus prevent this separated grain from being projected by the cylinder rearwardly onto the straw rack, thus materially increasing the efficiency of the machine.

A beater B is mounted in rear of cylinder C and above a grate G which is preferably constructed similarly to the cylinder grate and is carried by the straw rack S at the forward end thereof. This beater may be of any suitable construction though we preferably employ a beater such as that disclosed in the copending application of James E. Hill for threshing machines, Serial No. 236,508. The chaff and straw discharged from the cylinder grate are thrown downwardly by the beater B onto the grate G, where they are thoroughly agitated and spread, the grain freed from the straw and chaff passing through the grate G into the pan P, and the remaining straw and chaff being discharged onto the straw rack S.

When threshing grain which is thoroughly ripe and dry and in good condition for threshing, all of the rods 11 are preferably used in the cylinder grate and in the beater grate G. The rods are thus spaced so as to assure efficient separation of the grain while preventing passage of an undesirable amount of chaff through the grates into the grain pan. Under certain unfavorable conditions, or where threshing certain kinds of grain, it is frequently desirable to increase the distance between the rods of the grate. This permits more chaff to pass into the grain pan instead of over the straw rack, but renders it possible to recover much more grain than would be possible, under the conditions referred to, if the rods 11 were spaced closely together. To effect this increase in spacing of the rods 11, the nuts 14 are removed from bolts 4 and the clamping bar 13 is removed, after which every other rod 11 may be removed from the frame of the grate, the remaining rods being spaced twice as far apart as the rods were originally spaced. With the cylinder grate supported in the manner illustrated in Figs. 3 and 4, the bar 13 is readily accessible from the top of the machine so that this desired adjustment of the grate rods can be easily and quickly accomplished. After the desired rods have been removed from the grate, the bar 13 is replaced and is secured in position as previously described. As stated, the grate G is preferably constructed similarly to the cylinder grate and the rods of this grate may be selectively removed to increase the spacing thereof. The grate rods 11 are preferably straight and are inserted and removed from the grate by endwise movement.

This grate is disposed with its length in the direction of the length of the cylinder C as illustrated, and the rods can be readily inserted or removed from the frame of the grate expeditiously and by a simple endwise movement, the insertion of the rods into the grate being positively limited by the fingers 12. The grate thus constructed and mounted at an inclination downwardly toward the cylinder at the lower portion thereof, cooperates with the cylinder to assure efficient separation of the grain and enables the machine to handle a relatively large volume of material since unnecessary work due to separating from the straw and chaff on the straw rack grain which has already been separated by the cylinder and concave, is eliminated.

As clearly illustrated in Figure 4, the grate which receives the material discharged from the cylinder and concave, is disposed adjacent and in rear of the cylinder with its forward edge adjacent the rearward edge of the concave. The rods of this grate are straight and are removable from and insertible into the grate from the rearward portion thereof and by endwise movement. This renders it possible, by removing the clamping bar 13 to withdraw or insert the grate rods while the grate remains in position in the machine and in operative relation to the cylinder and the concave. In this manner, the grate can be adjusted to suit the condition of the grain being threshed with a minimum of delay and while the machine is in the field. This is of great importance, from the practical standpoint, as stoppage of the thresher means a loss to the thresherman. By constructing the grate in accordance with our invention, the relay in changing the spacing of the grate rods is reduced to a minimum and is more than compensated for by the improved operation and output of the threshing machine resulting from proper spacing of these rods. So far as we are aware, there was no grate structure known, prior to our invention, in which the spacing of the rods or equivalent elements of the grate could be adjusted to suit the condition of the grain while the grate remained in the machine and in operative relation to the cylinder and the concave. This we believe to be broadly new in threshing machines.

What we claim is:

1. In a grate structure for threshing machines, side bars, bolts connecting the bars, spacing sleeves about the bolts and holding the bars spaced apart, rods inserted through the bars and provided at one end with stop fingers limiting insertion of the rods through the bars, the rods being insertible into and removable from the bars by simple endwise movement and a stop bar removably secured on the bolts beyond and adjacent said fingers and preventing withdrawal of the rods from the bars.

2. In a grate structure for threshing machines, side bars, end brackets, bolts connecting the bars and securing them to the brackets, spacing sleeves about the bolts and holding the bars spaced apart, rods inserted through said bars and each having a stop finger at one end limiting insertion of the rod through the bars, the rods being insertible into and removable from the bars by simple endwise movement, and a stop bar removably secured on the bolts and spaced from the side bar from which the rods are inserted, said stop bar preventing withdrawal of the rods.

3. In combination in a threshing machine, a cylinder, a grate disposed to receive materials discharged from the cylinder, said grate comprising a plurality of spaced rods, and means for releasably securing the rods in the grate, said rods being independently removable from and replaceable in the grate when said grate is in the machine and in operative relation to the cylinder.

4. In combination in a threshing machine, a cylinder and a concave, a grate disposed to receive materials discharged from the cylinder and concave and having its forward edge disposed adjacent the rearward edge of the concave, said grate comprising a plurality of spaced rods independently insertible into and removable from the grate from the rear portion thereof and by endwise movement while the grate is in the machine and in operative relation to the cylinder and the concave.

5. In a grate structure for threshing machines, a plurality of frame bars disposed in alignment and provided with aligned openings, bolts connecting the bars, spacing sleeves disposed about the bolts and cooperating therewith for holding the bars in predetermined spaced relation, the sleeves and the bolts also cooperating to clamp the bars in position, rods inserted through the aligned openings of the bars, said rods being independently insertible into and removable from the bars by endwise movement, and means for releasably securing the rods against endwise movement.

6. In a grate structure for threshing machines, a plurality of frame bars disposed in alignment and provided with aligned openings, bolts connecting the bars, spacing sleeves disposed about the bolts and cooperating therewith for holding the bars in predetermined spaced relation, the sleeves and the bolts also cooperating to clamp the bars in position, rods inserted through the aligned openings of the bars, said rods being independently insertible into and removable from the bars by endwise movement, and means for releasably securing the rods against endwise movement, said frame bars being extended downwardly beneath the rods and forming baffles extending transversely of the grate.

7. In a grate structure for threshing machines, a plurality of bars disposed in spaced parallel relation and in a common plane, one of said bars being the top bar and another of said bars being the bottom bar of the grate, when said structure is in position in a threshing machine, the bars being provided with aligned openings, rods inserted through said openings, and means cooperating with the top bar for releasably securing the rods against endwise movement in either direction, the rods being independently removable and replaceable.

In witness whereof, we hereunto subscribe our names this 26th day of December, 1928.

JAMES E. HILL.
GEORGE W. TROUTMAN.